(12) United States Patent
Wright et al.

(10) Patent No.: US 10,920,116 B2
(45) Date of Patent: Feb. 16, 2021

(54) METHOD OF PREPARING CROSSLINKED PRESSURE-SENSITIVE ADHESIVES USING A LIGHT-EMITTING DIODE FOR CROSSLINKING

(71) Applicant: 3M INNOVATIVE PROPERTIES COMPANY, St. Paul, MN (US)

(72) Inventors: Robin E. Wright, Hudson, WI (US); Petra M. Stegmaier, Duesseldorf (DE)

(73) Assignee: 3M Innovative Properties Company, St. Paul, MN (US)

( * ) Notice: Subject to any disclaimer, the term of this patent is extended or adjusted under 35 U.S.C. 154(b) by 41 days.

(21) Appl. No.: 15/555,592

(22) PCT Filed: Mar. 22, 2016

(86) PCT No.: PCT/US2016/023566
§ 371 (c)(1),
(2) Date: Sep. 5, 2017

(87) PCT Pub. No.: WO2016/167924
PCT Pub. Date: Oct. 20, 2016

(65) Prior Publication Data
US 2018/0037775 A1   Feb. 8, 2018

Related U.S. Application Data

(60) Provisional application No. 62/146,519, filed on Apr. 13, 2015.

(51) Int. Cl.
| C08F 2/46 | (2006.01) |
| C08F 2/50 | (2006.01) |
| C08G 61/04 | (2006.01) |
| C09J 133/08 | (2006.01) |
| C09J 7/38 | (2018.01) |
| C09J 5/00 | (2006.01) |

(52) U.S. Cl.
CPC ............ *C09J 133/08* (2013.01); *C09J 5/00* (2013.01); *C09J 7/385* (2018.01); *C09J 2203/318* (2013.01); *C09J 2301/414* (2020.08); *C09J 2433/00* (2013.01)

(58) Field of Classification Search
CPC ........ C09J 7/0217; C09J 5/00; C09J 2433/00; C09J 133/08; C09J 2205/114; C08F 265/06
USPC ............... 522/72, 71, 189, 184, 6, 1; 520/1
See application file for complete search history.

(56) References Cited

U.S. PATENT DOCUMENTS

| 3,691,140 | A | 9/1972 | Silver |
| 4,166,152 | A | 8/1979 | Baker |
| 4,619,979 | A | 10/1986 | Kotnour |
| 4,636,432 | A | 1/1987 | Shibano |
| 4,656,218 | A | 4/1987 | Kinoshita |
| 4,737,559 | A | 4/1988 | Kellen |
| 4,843,134 | A | 6/1989 | Kotnour |
| 5,045,569 | A | 9/1991 | Delgado |
| 5,257,491 | A | 11/1993 | Rouyer |
| 5,550,175 | A | 8/1996 | Bredahl |
| 5,602,221 | A | 2/1997 | Bennett |
| 5,637,646 | A | 6/1997 | Ellis |
| 5,804,610 | A | 9/1998 | Hamer |
| 6,294,249 | B1 | 9/2001 | Hamer |
| 6,369,123 | B1 | 4/2002 | Stark |
| 6,586,491 | B2 | 7/2003 | Husemann |
| 7,510,764 | B2 | 3/2009 | Husemann |
| 8,093,310 | B2 | 1/2012 | Hirose |
| 2005/0234145 | A1* | 10/2005 | Sitzmann ............... C07F 9/5337 522/6 |
| 2009/0110922 | A1 | 4/2009 | Hirose |
| 2014/0120268 | A1 | 5/2014 | Akiyama |
| 2014/0220255 | A1 | 8/2014 | Akiyama |
| 2017/0145267 | A1* | 5/2017 | Liu .......................... C09J 4/06 |

FOREIGN PATENT DOCUMENTS

| CN | 102108133 | * | 6/2011 |
| CN | 102108133 | A | 6/2011 |
| CN | 103502279 | | 1/2014 |
| DE | 3625358 | | 2/1988 |
| DE | 202014101183 | * | 6/2014 |
| EP | 2500367 | | 9/2012 |
| EP | 2527383 | | 11/2012 |

(Continued)

OTHER PUBLICATIONS

Hinkelmann, DE 202014101183 Machine Translation, Jun. 12, 2014 (Year: 2014).*
Eastman, https://www.eastman.com/Markets/Adhesives/Pages/FAQs.aspx, 2012 (Year: 2012).*
Krepski et al, CN102108133 Machine Translation, Jun. 29, 2011 (Year: 2011).*
Czech, "Photoreactive UV-Crosslinkable Solvent—Free Acrylic Pressure—Sensitive Adhesives Containing Copolymerizable Photoinitiators Based on Benzophenones," European Polymer Journal, 2012, vol. 48, pp. 1446-1454.
International Search Report for PCT International Application No. PCT/US2016/023566, dated May 2, 2016, 4 pages.

*Primary Examiner* — Jessica Whiteley

(57) ABSTRACT

A method of preparing a crosslinked pressure-sensitive adhesive is provided, including exposing at least one radiation crosslinkable pressure-sensitive adhesive composition to radiation from at least one light-emitting diode to crosslink the radiation crosslinkable pressure-sensitive adhesive composition. The crosslinked pressure-sensitive adhesive is optionally a hot melt processable pressure-sensitive adhesive. A radiation crosslinked pressure-sensitive adhesive is provided, prepared by the method. Also, an adhesive article is provided including a flexible backing layer and the radiation crosslinked pressure-sensitive adhesive prepared by the method. The crosslinked pressure-sensitive adhesive tends to exhibit high shear without sacrificing peel force or tack.

12 Claims, No Drawings

(56) References Cited

FOREIGN PATENT DOCUMENTS

| EP | 2733186 | 5/2014 | | |
|----|---------|--------|---|---|
| JP | 2001-64612 | 3/2001 | | |
| JP | 2006-299017 | 11/2006 | | |
| JP | 2014201608 A2 | 10/2014 | | |
| WO | WO 1993-023224 | 11/1993 | | |
| WO | WO 1997-033945 | 9/1997 | | |
| WO | WO-2005108114 A2 * | 11/2005 | ............... | B44C 1/17 |
| WO | WO 2014/078118 A1 | 5/2014 | | |
| WO | WO 2014-078123 | 5/2014 | | |
| WO | WO 2014-142085 | 9/2014 | | |
| WO | WO 2015-131938 | 9/2015 | | |
| WO | WO-2015131938 A1 * | 9/2015 | ............... | C09J 7/381 |
| WO | WO 2016-106003 | 6/2016 | | |

* cited by examiner

METHOD OF PREPARING CROSSLINKED PRESSURE-SENSITIVE ADHESIVES USING A LIGHT-EMITTING DIODE FOR CROSSLINKING

CROSS REFERENCE TO RELATED APPLICATIONS

This application is a national stage filing under 35 U.S.C. 371 of PCT/US2016/023566, filed Mar. 22, 2016, which claims the benefit of U.S. Application No. 62/146,519, filed Apr. 13, 2015, the disclosure of which is incorporated by reference in its/their entirety herein.

TECHNICAL FIELD

The present disclosure relates to crosslinking pressure-sensitive adhesives.

BACKGROUND

Pressure-sensitive adhesive tapes are virtually ubiquitous in the home and workplace. In its simplest configuration, a pressure-sensitive adhesive tape comprises an adhesive and a backing, and the overall construction is tacky at the use temperature and adheres to a variety of substrates using only moderate pressure to form the bond. In this fashion, pressure-sensitive adhesive tapes constitute a complete, self-contained bonding system.

There are a wide variety of pressure-sensitive adhesive (PSA) materials available today that include natural crude or synthetic rubbers, block copolymers, and (meth)acrylic-based polymeric compositions. Hot melt PSAs are an alternative to solution-coated adhesives, and can be crosslinked to provide adhesive properties at elevated temperatures.

A number of different materials have been used as crosslinking agents using actinic radiation, e.g. polyfunctional acrylates, acetophenones, benzophenones, and triazines. In addition to actinic radiation processing, PSAs can be applied to substrates by solvent and hot-melt coating techniques. Although solvent coating techniques are widely used, hot-melt coating techniques may provide some environmental and economical advantages. However, unlike solvent coating techniques where the polymer drying and crosslinking are performed simultaneously, hot-melt coating requires that coating and crosslinking be performed sequentially. This is due to competing considerations: a polymer should not be highly crosslinked if it is to be hot-melt coated smoothly, yet the polymer needs to be crosslinked to achieve certain desirable performance properties such as e.g. high shear when the polymer is a PSA. Therefore, hot-melt coating is performed prior to crosslinking of the coated polymer.

SUMMARY

The present disclosure relates to crosslinking pressure-sensitive adhesives using at least one light-emitting diode.

In a first aspect, a method of preparing a crosslinked pressure-sensitive adhesive is provided. The method includes exposing at least one radiation crosslinkable pressure-sensitive adhesive composition to radiation from at least one light-emitting diode to crosslink the radiation crosslinkable pressure-sensitive adhesive composition.

In a second aspect, a radiation crosslinked pressure-sensitive adhesive is provided, according to the method of the first aspect.

In a third aspect, an adhesive article is provided. The adhesive article includes a flexible backing layer and the radiation crosslinked pressure-sensitive adhesive according to the method of the first aspect.

The above summary of the present disclosure is not intended to describe each disclosed aspect or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Pressure-sensitive adhesives (PSAs) are known to possess properties including the following: (1) aggressive and permanent tack, (2) adherence with no more than finger pressure, (3) sufficient ability to hold onto an adherend or substrate, and (4) sufficient cohesive strength to be removed cleanly from the adherend. Materials that have been found to function well as PSAs include polymers designed and formulated to exhibit the requisite viscoelastic properties resulting in a desired balance of tack, peel adhesion, and shear holding power. PSAs are characterized by being normally tacky at room temperature (e.g., 20° C.). PSAs do not embrace compositions merely because they are sticky or adhere to a surface.

These adhesive characteristics are assessed generally by means of tests which are designed to individually measure tack, adhesion (peel strength), and cohesion (shear holding power), as noted in A. V. Pocius in *Adhesion and Adhesives Technology: An Introduction*, $2^{nd}$ Ed., Hanser Gardner Publication, Cincinnati, Ohio, 2002. These measurements taken together constitute the balance of properties often used to characterize a PSA.

With broadened use of pressure-sensitive adhesive tapes over the years, performance requirements have become more demanding. Shear holding capability, for example, which originally was intended for applications supporting modest loads at room temperature, has now increased substantially for many applications in terms of operating temperature and load. So-called high performance pressure-sensitive adhesive tapes are those capable of supporting loads at elevated temperatures for 10,000 minutes. Increased shear holding capability has generally been accomplished by crosslinking the PSA, although considerable care must be exercised so that high levels of tack and adhesion are retained in order to retain the aforementioned balance of properties.

Central to all PSAs is a desired balance of adhesion and cohesion that is often achieved by optimizing the physical properties of an acrylic elastomer, such as glass transition temperature and modulus. For example, if the glass transition temperature ($T_g$) or modulus of the elastomer is too high, the Dahlquist criterion for tack (storage modulus less than $3 \times 10^6$ dynes/cm$^2$ at room temperature and oscillation frequency of 1 Hz) will not be met, and the material will not be tacky and is not useful by itself as a PSA material. Often in this case, low molecular weight, high $T_g$ resin polymers (tackifiers) or low molecular weight, low $T_g$ polymers (plasticizers) are used to modulate the $T_g$ and modulus into an optimal PSA range.

It has been discovered that preparing a crosslinked pressure-sensitive adhesive including exposing at least one radiation crosslinkable pressure-sensitive adhesive composition to radiation from at least one light-emitting diode (LED) can improve the high temperature shear performance of a crosslinked PSA, particularly a PSA containing a high tackifier loading. The use of a light-emitting diode as the source of radiation tends to provide a more consistent exposure, reduce local heating effects, decrease the adhesive crosslink density gradient through the thickness of the PSA, and minimize localized surface crosslinking (which can otherwise result in an undesirable drop in tack). In addition, the use of a LED as the source of radiation allows reduction or elimination of the use of a broadband UV source, which is known to have a large power and temperature dependence on its spectral energy distribution. LEDs offer high power within a narrow bandwidth, have a long lamp lifetime, use considerably less energy, and emit very little heat, as compared to medium-pressure mercury bulbs.

For the following Glossary of defined terms, these definitions shall be applied for the entire application, unless a different definition is provided in the claims or elsewhere in the specification.

Glossary

Certain terms are used throughout the description and the claims that, while for the most part are well known, may require some explanation. It should be understood that, as used herein:

As used in this specification and the appended embodiments, the singular forms "a", "an", and "the" include plural referents unless the content clearly dictates otherwise. Thus, for example, reference to "a compound" includes a mixture of two or more compounds. As used in this specification and the appended embodiments, the term "or" is generally employed in its sense including "and/or" unless the content clearly dictates otherwise.

As used in this specification, the recitation of numerical ranges by endpoints includes all numbers subsumed within that range (e.g. 1 to 5 includes 1, 1.5, 2, 2.75, 3, 3.8, 4, and 5).

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

The terms "comprises" and variations thereof do not have a limiting meaning where these terms appear in the description and claims.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

The term "(co)polymer" is inclusive of both homopolymers containing a single monomer and copolymers containing two or more different monomers.

The term "(meth)acrylic" or "(meth)acrylate" is inclusive of both acrylic and methacrylic (or acrylate and methacrylate). As used herein the term "acrylate" refers to monomeric acrylic or methacrylic esters of alcohols. Acrylate and methacrylate monomers, oligomers, or polymers are referred to collectively herein as "acrylates".

The term "aliphatic group" means a saturated or unsaturated linear or branched hydrocarbon group. This term is used to encompass alkyl, alkenyl, and alkynyl groups, for example.

The term "alkyl group" means a saturated hydrocarbon group that is linear, branched, cyclic, or combinations thereof and typically has 1 to 20 carbon atoms. In some embodiments, the alkyl group contains 1 to 18, 1 to 12, 1 to 10, 1 to 8, 1 to 6, or 1 to 4 carbon atoms. Examples of alkyl group include without limitation, methyl, ethyl, isopropyl, t-butyl, heptyl, dodecyl, octadecyl, amyl, 2-ethylhexyl, and the like. The term "alkylene group" refers to a divalent alkyl group.

The term "alicyclic group" means a cyclic hydrocarbon group having properties resembling those of aliphatic groups. The term "aromatic group" or "aryl group" means a mono- or polynuclear aromatic hydrocarbon group.

As will be apparent to those skilled in the art, the term "type (II) photocrosslinker", means a photocrosslinker, which upon irradiation, becomes excited to a higher energy state in which it can abstract a hydrogen atom from a hydrogen-donating molecule, thereby generating on the hydrogen-donating molecule a free radical capable of further reaction, such as e.g., free radical addition polymerization and free radical addition crosslinking. The expression "co-polymerized type (II) photocrosslinker" is meant to reflect that the photocrosslinker is co-polymerized with any suitable polymeric matrix.

The term "hydrogen-donating monomer" is meant to designate a monomer which is capable of relatively easily donating a hydrogen atom to a photocrosslinker which, upon irradiation, is excited to a higher energy state which makes it capable of abstracting an abstractable hydrogen atom. The expression "co-polymerized hydrogen-donating monomer" is meant to reflect that the hydrogen-donating monomer is co-polymerized with any suitable polymeric matrix.

The term "solvent" refers to a substance that dissolves another substance to form a solution.

The term "total monomer" refers to the combination of all monomers in a pressure-sensitive adhesive composition, including both in a polymerized reaction product and in optional additional materials.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in some embodiments," "in certain embodiments," "in one embodiment," "in many embodiments" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

Various exemplary embodiments of the disclosure will now be described. Exemplary embodiments of the present disclosure may take on various modifications and alterations without departing from the spirit and scope of the disclosure.

Accordingly, it is to be understood that the embodiments of the present disclosure are not to be limited to the following described exemplary embodiments, but are to be controlled by the limitations set forth in the claims and any equivalents thereof.

In a first aspect, a method is provided. The method includes preparing a crosslinked pressure-sensitive adhesive including exposing at least one radiation crosslinkable pressure-sensitive adhesive composition to radiation from at least one light-emitting diode to crosslink the radiation crosslinkable pressure-sensitive adhesive composition and thereby form the crosslinked pressure-sensitive adhesive.

In certain embodiments, a suitable crosslinkable pressure-sensitive adhesive composition includes a polymerized reaction product of components, and optionally one or more additional materials. The components of a polymerized reaction product typically comprise at least one alkyl (meth) acrylate monomer and at least one initiator, and optionally: at least one acid-functional ethylenically unsaturated monomer, at least one non-acid-functional ethylenically unsaturated monomer, at least one radiation-sensitive crosslinker, or combinations thereof. The one or more optional additional materials typically include at least one non-photo-crosslinkable (co)polymer, at least one radiation-sensitive crosslinker, at least one adjuvant, at least one tackifier, or combinations thereof. The pressure-sensitive adhesive composition comprises at least one radiation-sensitive crosslinker, which may be provided in the polymerized reaction product, the optional materials, or both. When the radiation-sensitive crosslinker is provided in the polymerized reaction product, the radiation-sensitive crosslinker is typically an unsaturated radiation-sensitive photo-crosslinkable monomer.

In certain embodiments of the polymerized reaction product of components, the alkyl group of the alkyl (meth) acrylate monomer optionally includes from 1 to 24 carbon atoms, or from 4 to 20, or from 6 to 15, or from 6 to 10 carbon atoms. Suitable alkyl (meth)acrylate monomers for use in a polymerized reaction product include for example and without limitation, methyl acrylate, ethyl acrylate, n-propyl acrylate, isopropyl acrylate, n-butyl acrylate, isobutyl acrylate, n-pentyl acrylate, iso-pentyl acrylate, n-hexyl acrylate, iso-hexyl acrylate, cyclohexyl acrylate, octyl acrylate, iso-octyl acrylate, 2-ethylhexyl acrylate, decyl acrylate, lauryl acrylate, 2-propylheptyl acrylate, stearyl acrylate, isobornyl acrylate, and combinations thereof. In certain embodiments, the alkyl (meth)acrylate monomer is selected from the group consisting of iso-octyl acrylate, 2-ethylhexyl acrylate, butyl acrylate, and combinations thereof. Typically, the polymerized reaction product is prepared from a monomer mixture comprising from 50 to 100 parts, from 70 to 100 parts, from 80 to 100 parts, or even from 90 to 100 parts by weight of at least one linear or branched alkyl (meth)acrylate monomer.

In a typical photopolymerization method, a monomer mixture may be irradiated with radiation, such as ultraviolet (UV) rays, in the presence of a photopolymerization initiator (i.e., photoinitiators). Suitable exemplary photoinitiators are those available under the trade designations IRGACURE and DAROCUR from BASF (Ludwigshafen, Germany) and include 1-hydroxycyclohexyl phenyl ketone (IRGACURE 184), 2,2-dimethoxy-1,2-diphenylethan-1-one (IRGACURE 651), bis(2,4,6-trimethylbenzoyl)phenylphosphineoxide (IRGACURE 819), 1-[4-(2-hydroxyethoxy)phenyl]-2-hydroxy-2-methyl-1-propane-1-one (IRGACURE 2959), 2-benzyl-2-dimethylamino-1-(4-morpholinophenyl)butanone (IRGACURE 369), 2-methyl-1-[4-(methylthio)phenyl]-2-morpholinopropan-1-one (IRGACURE 907), Oligo [2-hydroxy-2-methyl-1-[4-(1-methylvinyl)phenyl] propanone] ESACURE ONE (Lamberti S.p.A., Gallarate, Italy), and 2-hydroxy-2-methyl-1-phenyl propan-1-one (DAROCUR 1173). Additional suitable photoinitiators include for example and without limitation, benzyl dimethyl ketal, 2-methyl-2-hydroxypropiophenone, benzoin methyl ether, benzoin isopropyl ether, anisoin methyl ether, aromatic sulfonyl chlorides, photoactive oximes, and combinations thereof. When used, a photoinitiator is typically present in an amount between about 0.01 to about 5.0 parts, or from 0.1 to 0.5 parts, per 100 parts by weight of total monomer.

A monomer mixture is optionally initiated using a thermal initiator. Suitable thermal initiators include for example and without limitation, 2,2'-azobis(2,4-dimethylvaleronitrile), 2,2'-azobisisobutyronitrile (VAZO 64, available from E.I. du Pont de Nemours Co.), 2,2'-azobis(2,4-dimethylpentanenitrile) (VAZO 52, available from E.I. du Pont de Nemours Co.), 2,2'-azobis-2-methylbutyronitrile, (1,1'-azobis(1-cyclohexanecarbonitrile), 2,2'-azobis(methyl isobutyrate), 2,2'-azobis(2-amidinopropane) dihydrochloride, 2,2'-azobis (4-methoxy-2,4-dimethylvaleronitrile), 4,4'-azobis(4-cyanopentanoic acid) and its soluble salts (e.g., sodium, potassium)benzoyl peroxide, acetyl peroxide, lauroyl peroxide, decanoyl peroxide, dicetyl peroxydicarbonate, di(4-t-butyl-cyclohexyl) peroxydicarbonate, di(2-ethylhexyl) peroxydicarbonate, t-butylperoxypivalate, t-butylperoxy-2-ethylhexanoate, dicumyl peroxide, potassium persulfate, sodium persulfate, ammonium persulfate, combinations of the persulfates with sodium metabisulfite or sodium bisulfate, benzoyl peroxide plus dimethylaniline, cumene hydroperoxide plus cobalt naphthenate, and combinations thereof. When used, a thermal initiator is typically present in an amount from about 0.01 to about 5.0 parts, or from 0.1 to 0.5 parts, per 100 parts by weight of total monomer.

In certain embodiments of the polymerized reaction product of components, optionally one or more acid-functional ethylenically unsaturated monomers are included. The acid-functional group may be an acid per se, such as a carboxylic acid, or a portion may be salt thereof, such as an alkali metal carboxylate. Suitable acid-functional ethylenically unsaturated monomers include for example and without limitation, acrylic acid, methacrylic acid, itaconic acid, fumaric acid, crotonic acid, citraconic acid, maleic acid, oleic acid, beta-carboxyethyl (meth)acrylate, 2-sulfoethyl methacrylate, styrene sulfonic acid, 2-acrylamido-2-methylpropanesulfonic acid, and combinations thereof. Due to their availability, an acid-functional monomer is generally selected from ethylenically unsaturated carboxylic acids (i.e., (meth)acrylic acids). When even stronger acids are desired, acidic monomers can include the ethylenically unsaturated sulfonic acids and ethylenically unsaturated phosphonic acids, such as vinylphosphonic acid.

When used, an acid-functional ethylenically unsaturated monomer is present in an amount of up 25 parts by weight, up 20 parts by weight, up to 15 parts by weight, or up to 10 parts by weight, based on 100 parts by weight of total monomer. When used, an acid-functional ethylenically unsaturated monomer is present in an amount of at least 0.5 parts by weight, at least 1.0 part by weight, at least 1.5 parts by weight, or at least 4.0 parts by weight, based on 100 parts by weight of total monomer. In certain embodiments, an acid-functional, ethylenically unsaturated monomer is present in an amount of 0.5 parts to 25 parts, or 1.0 part to 15 parts, or 1.5 parts to 10 parts, based on 100 parts by weight of total monomer.

In certain embodiments of the polymerized reaction product of components, optionally one or more non-acid-functional ethylenically unsaturated monomers are included. Such polar monomers are typically both somewhat oil soluble and water soluble. Suitable non-acid-functional ethylenically unsaturated monomers include for example and without limitation, 2-hydroxyethyl (meth)acrylate, 4-hydroxybutyl (meth)acrylate, acrylamide, mono- or di-N-alkyl substituted acrylamide, t-butyl acrylamide, dimethylaminoethyl acrylamide, N-octyl acrylamide, a poly(alkoxyalkyl) (meth)acrylate including 2-(2-ethoxyethoxy)ethyl (meth) acrylate, 2-ethoxyethyl (meth)acrylate, 2-methoxyethoxyethyl (meth)acrylate, 2-methoxyethyl methacrylate, a polyethylene glycol mono(meth)acrylate, an alkyl vinyl ether (including vinyl methyl ether), acrylonitrile, methacrylonitrile, vinyl acetate, isobornyl acrylate, cyano ethyl acrylate, maleic anhydride, hydroxyalkylacrylates, beta-carboxyethyl acrylate, vinyl esters of neodecanoic, neononanoic, neopentanoic, 2-ethylhexanoic, or propionic acids, and mixtures thereof.

In some embodiments, the optional one or more non-acid-functional ethylenically unsaturated monomer includes a hydrogen-donating monomer. Exemplary co-polymerized hydrogen-donating monomers include monomers comprising at least one abstractable hydrogen atom, typically located on a carbon atom in a position alpha to a nitrogen or an oxygen atom, or carried by terminal or pendant mercapto groups potentially protected during polymerization. Suitable hydrogen-donating monomers include for example and without limitation, N,N-dimethyl acrylamide, N-vinyl caprolactam, N-Vinylpyrrolidone, N-isopropyl acrylamide, N,N-dimethylaminoethyl methacrylate, 2-[[(Butylamino) carbonyl]oxy]ethyl acrylate N,N-dimethylaminopropyl methacrylamide, N,N-diethylaminopropyl methacrylamide, N,N-dimethylaminoethyl acrylate, N,N-diethylaminoethyl acrylate, N,N-dimethylaminopropyl acrylate, N,N-diethylaminopropyl acrylate, N,N-diethylaminoethyl methacrylate, N,N-dimethylaminoethyl acrylamide, N,N-dimethylaminoethyl methacrylamide, N,N-diethylaminoethyl acrylamide, N,N-diethylaminoethyl methacrylamide, and combinations thereof. In an alternative exemplary embodiment, the hydrogen-donating monomer for use herein may be co-polymerized into a crosslinking polymer, preferably an acrylate crosslinking polymer, and distinct from the polymerized reaction product of components.

When used, a non-acid-functional ethylenically unsaturated monomer is present in an amount of up 10 parts by weight, or up to 5 parts by weight, or up to 3 parts by weight, or up to 2 parts by weight, based on 100 parts by weight of total monomer. When used, a non-acid-functional ethylenically unsaturated polar monomer is present in an amount of at least 0.05 parts by weight, or at least 0.1 parts by weight, or at least 0.15 parts by weight, or at least 0.5 parts by weight, based on 100 parts by weight of total monomer. Stated another way, a non-acid-functional ethylenically unsaturated monomer may be present in an amount from 0.05 to 10 parts, from 0.05 to 5 parts, from 0.10 to 3 parts, or even from 0.15 to 2 parts by weight per 100 parts by weight of total monomer.

There are several crosslinking mechanisms for acrylic polymers (particularly, adhesives) including free-radical copolymerization of multifunctional, ethylenically unsaturated groups with the other monomers, and covalent or ionic crosslinking through the functional monomers, such as acrylic acid. A suitable covalent crosslinker includes bis-aziridines, for instance 1,1'-isophthaloylbis(2-methylaziridine).

Another method is the use of UV crosslinkers, such as copolymerizable benzophenones or post-added photocrosslinkers, such as multifunctional benzophenones and triazines. A variety of different materials have typically been used as crosslinking agents, e.g., polyfunctional acrylates, acetophenones, benzophenones, and triazines. In certain embodiments, the at least one radiation-sensitive crosslinker of the crosslinkable pressure-sensitive adhesive composition includes a co-polymerized type (II) photocrosslinker. Suitable co-polymerized type (II) photocrosslinkers for use herein will be easily identified by those skilled in the art, in the light of the present description. In one exemplary embodiment, the co-polymerized type (II) photocrosslinker may be co-polymerized together with the other monomers present in the mixture used to prepare the polymerized reaction product of components. In an alternative exemplary embodiment, the co-polymerized type (II) photocrosslinker for use herein may be co-polymerized into a crosslinking polymer, preferably an acrylate crosslinking polymer, and distinct from the polymerized reaction product of components.

In certain embodiments, co-polymerized type (II) photocrosslinkers include mono- and multi-ethylenically unsaturated aromatic ketone comonomers free of ortho-aromatic hydroxyl groups such as those disclosed in U.S. Pat. No. 4,737,559 (Kellen et al.). Suitable co-polymerized type (II) crosslinkers include for example and without limitation, para-acryloxybenzophenone (ABP), para-acryloxyethoxybenzophenone (AEBP), para-N-(methylacryloxyethyl)-carbamoylethoxybenzophenone, 4-acryloyloxydiethoxy-4-chlorobenzophenone, para-acryloxyacetophenone, ortho-acrylamidoacetophenone, acrylated anthraquinones, acrylated benzophenone derivatives, and combinations thereof.

In certain embodiments, the polymerized reaction product of components optionally comprises a crosslinking polymer. Suitable compositions for forming a crosslinking polymer for use herein will be easily identified by those skilled in the art, in the light of the present disclosure. Exemplary compositions useful for preparing a crosslinking polymer for use herein include for instance and without limitation, those comprising a monomer mixture comprising monomers selected from the group consisting of acrylic monomers, vinyl ester monomers, acryl amide monomers, alkyl (meth) acryl amide monomers, dialkyl acryl amide, styrenic monomers, and any combinations or mixtures thereof.

Accordingly, crosslinking polymers for use herein may be acrylate, vinyl ester, acryl amide, alkyl acryl amide, dialkyl acryl amide or styrene (co)polymers, including in particular monomers such as e. g. alkyl (meth)acrylamide monomers, di aryl (meth)acrylamide monomers, styrenic monomers (in particular low Tg styrenic monomers such as, e.g., butoxystyrene monomers), vinyl ester monomers, and any combinations or mixtures thereof. In a preferred aspect, the crosslinking polymer is an acrylate crosslinking polymer. Compositions useful for forming the acrylate crosslinking polymer for use herein may be identical or distinct from the compositions used for forming the polymerized reaction product of components, as described herein.

In certain embodiments, the acrylate crosslinking polymer is prepared from a monomer mixture comprising at least one linear or branched alkyl (meth)acrylate monomer, wherein the linear or branched alkyl group of the alkyl (meth) acrylate monomer preferably comprises from 1 to 24, more preferably from 4 to 20, even more preferably 6 to 15, still more preferably from 6 to 10 carbon atoms. The linear or branched alkyl (meth)acrylate monomer is optionally selected from the group consisting of methyl acrylate, ethyl acrylate, n-propyl acrylate, isopropyl acrylate, n-butyl acrylate, isobutyl acrylate, n-pentyl acrylate, iso-pentyl acrylate, n-hexyl acrylate, iso-hexyl acrylate, cyclohexyl acrylate, octyl acrylate, iso-octyl acrylate, 2-ethylhexyl acrylate, decyl acrylate, lauryl acrylate, 2-propylheptyl acrylate, stearyl acrylate, isobornyl acrylate, and any combinations or mixtures thereof. More preferably, the alkyl (meth)acrylate monomer for use herein is selected from the group consisting of iso-octyl acrylate, 2-ethylhexyl acrylate, butyl acrylate, and any combinations or mixtures thereof. Still more preferably, the alkyl (meth)acrylate monomer for use herein comprises (or consists of) iso-octyl acrylate.

According to a particular embodiment, a vinyl ester (co)-monomer, preferably a vinyl ester of versatic acid (co)-monomer, may be present in the (pre-polymerization) monomer mixture used to prepare the crosslinking polymer, typically in an amount of from 0 to 50 parts co-monomer, and is thus typically (co)polymerized with the acrylate monomers. Suitable vinyl esters of versatic acid (co)-monomers include the commercially available monomer: Veova 10, commercially available from Momentive, Columbus, Ohio. Typically the vinyl ester co-monomer is used in amounts ranging from 0.5 to 40 parts, from 1.0 to 30 parts, from 5 to 25 parts, from 10 to 20 parts, or even from 15 to 20 parts, by weight per 100 parts by weight of acrylate crosslinking polymer.

The crosslinking polymer is typically present in an amount of from 0.5 to 30 parts, from 0.5 to 20 parts, from 1.0 to 10 parts, or even from 2.0 to 8.0 parts by weight per 100 parts by weight of total monomer (in the polymerized reaction product of components).

In a particular embodiment, the co-polymerized type (II) photocrosslinker and/or the hydrogen-donating monomer for use herein may be co-polymerized with the crosslinking polymer, preferably the acrylate crosslinking polymer.

The at least one radiation-sensitive crosslinker is typically present in an amount of at least 0.05 parts by weight per 100 parts by weight of copolymer or at least 0.10 parts by weight per 100 parts by weight of total monomer, such as from 0.06 to 1 parts, from 0.11 to 1 parts, from 0.16 to 1 parts, from 0.18 to 0.70 parts, or even from 0.20 to 0.50 parts by weight per 100 parts by weight of total monomer (in the polymerized reaction product of components).

In some embodiments of the crosslinkable pressure-sensitive adhesive composition, optionally one or more non-photocrosslinkable (co)polymers are included. Suitable non-photocrosslinkable (co)polymer include for example and without limitation, poly(methyl methacrylate), polyvinylbutyral, polystyrene and polyacrylonitrile, and combinations thereof. One or more non-photocrosslinkable (co)polymers are typically present in an amount from about 0.1 to about 25 parts by weight per 100 parts by weight of total monomer.

In order to increase cohesive strength of the crosslinked pressure-sensitive adhesive composition, a multifunctional (meth)acrylate may be incorporated into the crosslinkable pressure-sensitive adhesive composition. A multifunctional (meth)acrylate is particularly useful for emulsion or bulk polymerization, typically at low levels. Suitable multifunctional (meth)acrylates include for example without limitation, a di(meth)acrylate, tri(meth)acrylate, and tetra(meth) acrylate, such as 1,6-hexanediol di(meth)acrylate, a poly(ethylene glycol) di(meth)acrylate, polybutadiene di(meth) acrylate, a polyurethane di(meth)acrylate, propoxylated glycerin tri(meth)acrylate, and mixtures thereof.

When used, a multifunctional (meth)acrylate monomer is present in an amount of up to 0.05 parts or up to 0.1 parts, based on 100 parts by weight of total monomer. When used, a multifunctional (meth)acrylate monomer is present in an amount of at least 0.001 parts by weight or at least 0.005 parts, based on 100 parts by weight of total monomer. In certain embodiments, a multifunctional (meth)acrylate monomer is present in an amount of 0.001 parts to 0.1 parts, and in other embodiments 0.005 parts to 0.05 parts, based on 100 parts by weight of total monomer.

The crosslinkable pressure-sensitive adhesive composition may be prepared via suspension polymerizations as disclosed in U.S. Pat. No. 3,691,140 (Silver); U.S. Pat. No. 4,166,152 (Baker et al.); U.S. Pat. No. 4,636,432 (Shibano et al); U.S. Pat. No. 4,656,218 (Kinoshita); and U.S. Pat. No. 5,045,569 (Delgado).

Solventless polymerization methods may also be utilized to prepare the crosslinkable pressure-sensitive adhesive composition, such as the continuous free radical polymerization method described in U.S. Pat. No. 4,619,979 (Kotnour et al.) and U.S. Pat. No. 4,843,134 (Kotnour et al.), the essentially adiabatic polymerization methods using a batch reactor described in U.S. Pat. No. 5,637,646 (Ellis), and the methods described for polymerizing packaged pre-adhesive compositions described in U.S. Pat. No. 5,804,610 (Hamer et al.).

In certain embodiments of the crosslinkable pressure-sensitive adhesive composition, optionally one or more conventional adjuvants are included. Suitable adjuvants include for example and without limitation, a radiation-crosslinkable additive, a thickener, a particulate filler, an antioxidant, a colorant, a scent, or combinations thereof. In certain embodiments, the radiation-crosslinkable additive includes at least one bis(benzophenone).

Efforts have been made to improve the adhesion of (meth)acrylic-based adhesives, i.e., develop more aggressive tack; tackifying the polymer is commonly practiced. In certain embodiments of the crosslinkable pressure-sensitive adhesive composition, optionally one or more tackifiers are included. The pressure-sensitive adhesive compositions of this disclosure will preferably provide a desired balance of tack, peel adhesion, and shear holding power, and further conform to the Dahlquist criterion for tack (storage modulus less than $3 \times 10^6$ dynes/cm$^2$ at room temperature and oscillation frequency of 1 Hz). Certain deleterious effects can be observed when tackifiers are present during bulk acrylic polymerization reactions. Depending on the structure of the tackifier, undesirable effects of adding a tackifier include the interference with light penetration and/or the alteration of the final polymer structure if the tackifier acts as a chain-transfer or chain-terminating agent. Such effects can adversely influence the performance and stability of acrylates polymerized in the presence of these tackifiers. Chain termination can also result in undesirably high residual volatile materials. Advantageously, it is possible to select one or more radiation wavelengths provided by at least one LED, for crosslinking of the pressure-sensitive adhesive, which do not substantially overlap with wavelengths at which a particular tackifier has absorption.

When at least one tackifier is present in the crosslinkable pressure-sensitive adhesive composition, the tackifier typically includes at least one terpene phenolic, rosin, rosin ester, ester of hydrogenated rosin, synthetic hydrocarbon resin, polyterpenes, aromatic-modified polyterpene resins, coumarone-indene resins, hydrocarbon resins such as alpha pinene-based resins, beta pinene-based resins, limonene-based resins, aliphatic hydrocarbon-based resins, aromatic-modified hydrocarbon-based resins, aromatic hydrocarbon resins, dicyclopentadiene-based resins, or combinations thereof. In certain embodiments, the tackifier is a terpene resin, a hydrocarbon resin, a rosin resin, a petroleum resin, or combination thereof. Suitable synthetic hydrocarbon resins include for example and without limitation, aliphatic C5 hydrocarbons, aromatic C9 hydrocarbons, partially hydrogenated versions of any of the foregoing, fully hydrogenated versions of any of the foregoing, and combinations thereof.

Various types of tackifiers include phenol modified terpenes and rosin esters such as glycerol esters of rosin and pentaerythritol esters of rosin that are available under the trade names NUROZ, NUTAC (Newport Industries), PERMALYN, STAYBELITE, FORAL (Eastman). Also available are hydrocarbon resin tackifiers that typically come from C5 and C9 monomers by products of naphtha cracking and are available under the trade names PICCOTAC, EASTOTAC, REGALREZ, REGALITE (Eastman), ARKON (Arakawa), NORSOLENE, WINGTACK (Cray Valley), NEVTAC LX (Neville Chemical Co.), HIKOTACK, HIKOREZ (Kolon Chemical), NOVARES (Ruetgers N.V.), QUINTONE (Zeon), ESCOREZ (Exxon Mobile Chemical), NURES, and H-REZ (Newport Industries).

When used, the at least one tackifier is typically present in an amount greater than 10 parts per weight per 100 parts by weight of total monomer, or greater than 20 parts per weight, or greater than 30 parts per weight, or greater than 40 parts per weight per 100 parts by weight of total monomer, such as in amount from 40 parts to 70 parts by weight per 100 parts by weight of total monomer.

In certain embodiments, the crosslinked pressure-sensitive adhesive includes a hot melt processable pressure-sensitive adhesive, whereas in other embodiments the crosslinked pressure-sensitive adhesive further includes a solvent.

A hot melt processable radiation crosslinkable pressure-sensitive adhesive composition may be prepared by a variety of hot melt techniques. Generally, the methods comprise providing a hot melt mixing apparatus, providing the polymerized reaction product of components and one or more optional materials in a hot melt mixing apparatus to prepare a hot melt blend, and removing the blend from the hot melt mixing apparatus to form a hot melt processable pressure-sensitive adhesive.

A number of hot melt mixing techniques using a variety of hot melt mixing equipment are suitable for preparing hot melt processable pressure-sensitive adhesive compositions. Both batch and continuous mixing equipment may be used. Examples of batch methods include those using a BRABENDER (e. g. a BRABENDER PREP CENTER, commercially available from C.W. Brabender Instruments, Inc.; South Hackensack, N.J.) or BANBURY internal mixing and roll milling equipment (e.g. equipment available from Farrel Co.; Ansonia, Conn.). Examples of continuous methods include single screw extruding, twin screw extruding (e.g., corotating or counterrotating extruders), disk extruding, reciprocating single screw extruding, pin barrel single screw extruding, planetary extruding, and ring extruding. Continuous methods can utilize distributive elements, pin mixing elements, static mixing elements, and dispersive elements such as MADDOCK mixing elements and SAXTON mixing elements. A single hot melt mixing apparatus may be used, or a combination of hot melt mixing equipment may be used to prepare hot melt blends and hot melt processable pressure-sensitive adhesive compositions. In some embodiments, it may be desirable to use more than one piece of hot melt mixing equipment. For example, one extruder, such as, for example, a single screw extruder, can be used to hot melt process a hot melt processable elastomeric (meth)acrylate random copolymer contained within a thermoplastic packaging material. The output of this extruder can be fed into a second extruder, for example, a twin screw extruder for hot melt mixing with additional components. Hot melt blends are used to form hot melt processable pressure-sensitive adhesive compositions upon completion of a hot melt blending process.

The output of the hot melt mixing is optionally coated onto a substrate to form an adhesive layer. If a batch apparatus is used, the hot melt blend can be removed from the apparatus and placed in a hot melt coater or extruder and coated onto a substrate. If an extruder is used to prepare a hot melt blend, the blend can be directly extruded onto a substrate to form an adhesive layer in a continuous forming method. In the continuous forming method, the adhesive can be drawn out of a film die and subsequently contacted to a moving plastic web or other suitable substrate. Accordingly, the method of preparing a crosslinked pressure-sensitive adhesive often further includes coating the radiation crosslinkable pressure-sensitive adhesive composition onto a substrate before the radiation crosslinking.

In certain embodiments, hot melt processable pressure-sensitive adhesive compositions according to the disclosure are prepared. Methods of making packaged (co)polymer compositions such as hot melt adhesives and the resulting packaged compositions are known. German Patent No. 36 25 358 describes a hot melt adhesive block in a thermoplastic film. The film is melted and mixed with the adhesive in an extrusion process. U.S. Pat. No. 5,257,491 describes a method of packaging a thermoplastic or thermosetting hot melt adhesive in which a portion of an adhesive composition is surrounded with a plastic packaging material. The plastic packaging material does not substantially adversely affect the adhesive characteristics of a molten mixture of the adhesive and the plastic packaging material. PCT International Publication No. WO 93/23224 describes a method for packaging hot melt adhesive compositions in which molten hot melt adhesive is poured into a mold lined with a plastic film. The plastic film is meltable with the adhesive composition and blendable into the molten adhesive composition.

Packaging material used to form the reaction vessel or container is preferably made of a material that when combined with the adhesive composition does not substantially adversely affect the desired adhesive characteristics. A hot melt coated adhesive produced from a mixture of the adhesive composition and the packaging material may have improved adhesive properties compared to a hot melt coated adhesive produced from the adhesive composition alone.

In one embodiment of the disclosure, the reaction mixture is substantially surrounded with the packaging material; in another embodiment of the disclosure, the reaction mixture is completely surrounded with the packaging material. In this embodiment, it is intended that the reaction mixture be completely surrounded by the packaging material, but random variations in production may produce occasional packaged pre-adhesives in which the reaction mixture is not completely surrounded with the packaging material. In yet other embodiments, the reaction mixture is disposed between a pair of sheets.

At least one component of the packaging material (more preferably the entirety of the packaging material) preferably melts at or below the processing temperature of the adhesive (i.e., the glass transition temperature Tg, at which the adhesive composition begins to flow). The packaging material preferably has a melting point of 200° C. or less, preferably 170° C. or less. In a preferred embodiment the melting point ranges from 90° C. to 150° C.

The packaging material may be a flexible thermoplastic polymeric film, more preferably an unsupported, non-laminate thermoplastic polymer film. The packaging material is preferably selected from ethylene-acrylic acid, ethylene-vinyl acetate, polypropylene, polyethylene, polybutadiene, or ionomeric films. In a presently preferred embodiment, the packaging material is an ethylene-acrylic acid or ethylene-vinyl acetate film. Particularly suitable polymeric films include heat sealable linear low density polyethylene (LLDPE) films produced by 3M Company (St. Paul, Minn.).

In practicing some embodiments of the present disclosure, films ranging in thickness from about 0.01 mm to about 0.25 mm may be used. The thicknesses preferably range from about 0.025 mm to about 0.127 mm to obtain films that have good strength during processing while being thin enough to heat seal quickly and minimize the amount of film material used.

The amount of packaging material depends upon the type of material and the desired end properties. The amount of packaging material typically ranges from about 0.5 percent to about 20 percent of the total weight of the reaction mixture and the packaging material. Preferably, the packaging material is between 2 percent and 15 percent by weight, and more preferably between 3 percent and 5 percent.

Suitable packaging materials may contain plasticizers, stabilizers, dyes, perfumes, fillers, slip agents, antiblock agents, flame retardants, anti-static agents, microwave susceptors, thermally conductive particles, electrically conductive particles, and/or other materials to increase the flexibility, handleability, visibility, or other useful property of the film, as long as they do not adversely affect the desired properties of the adhesive.

The packaging material should be appropriate for the polymerization method used. For example, with photopolymerization, it is necessary to use a film material that is sufficiently transparent to ultraviolet radiation at the wavelengths necessary to effect polymerization.

The present disclosure also provides methods for making packaged viscoelastic adhesive compositions in which the packaging material is either retained following polymerization (and thus becomes part of the final product), i.e. a "Type I Composition", or is removed following polymerization and prior to subsequent processing, i.e. a "Type II Composition". The two types of compositions will be discussed separately further below. The description of the two types of products will be made with particular reference to hot melt adhesive compositions. However, the principles described below are equally applicable to other types of viscoelastic compositions, including pressure sensitive adhesives, adhesives generally, hot melt processable sealants, vibration damping materials, and viscoelastic gels useful for medical applications.

The present disclosure provides a method of making a packaged, thermoplastic or thermosettable, hot melt adhesive composition. For Type I compositions, the packaging material is selected such that it does not substantially adversely affect the desired adhesive properties of the hot melt adhesive composition when the hot melt adhesive composition and the packaging material are heated above the melting temperature of at least one component of the packaging material, and mixed together to form a flowable, coatable melt.

The disclosure also provides a method of making two or more packages of a packaged, thermoplastic or thermosettable hot melt adhesive. In this method, two or more portions of a reaction mixture are provided and each of the portions is completely surrounded with a packaging material. These portions are then (co)polymerized as described above.

In one preferred embodiment, the reaction mixture is completely surrounded by the packaging material. Preferably, from 0.1 to 5,000 g of reaction mixture is completely surrounded by the packaging material. In another preferred embodiment, from 1 to 1,000 g of reaction mixture is completely surrounded by the packaging material.

In the Type II compositions, the packaging material is removed after polymerization so that any further processing, e.g., melting, coating, or simply application of the adhesive, involves only the adhesive. The adhesive and reaction mixtures described above in the case of the Type I compositions are equally suitable for the Type II compositions, as are the polymerization processes and conditions used to prepare the adhesive.

The packaging materials described in connection with the Type I compositions are also suitable. However, because the packaging material is removed before any post-polymerization processing, the choice of packaging material is not limited to materials that will not substantially affect the adhesive properties of the final product when melted together. Thus, a wide variety of packaging material may be used, with materials permitting ready removal from the adhesive being preferred.

To enhance the ability to remove the adhesive from the packaging material, the packaging material may be provided with a release material. Examples of applications in which the packaging material is removed prior to post-polymerization processing include moisture-curable sealant compositions. These adhesive compositions would preferably be prepared in the form of a sealed pouch which is stripped to permit application of the sealant composition. Other examples include optically clear adhesives.

In the practice of one embodiment of the disclosure, two lengths of thermoplastic film are heat sealed together across the bottom and on each of the lateral edges on a liquid form-fill-seal machine to form an open ended pouch. The reaction mixture is pumped through a hose to fill the pouch, and the pouch is then heat sealed across the top to completely surround the adhesive composition.

Preferably, the form-fill-seal machine is equipped with an impulse sealer to form the top and bottom seal across the pouches. Such a sealer has one or two sets of jaws that clamp the pouch shut before sealing. A sealing wire is then heated to effect the seal, and the seal is cooled before the jaws are released. The sealing temperature is generally above the softening point and below the melting point of the film used to form the pouch.

During the sealing process, it is desirable to get most of the air out of the pouch before sealing. A small amount of air is tolerable so long as the amount of oxygen is not sufficient to substantially interfere with the polymerization process. For ease of handling, it is desirable to seal the pouches as soon as they are filled with the composition, although immediate sealing is not necessary in all cases. In some cases the reaction mixture can alter the packaging material, and it is desirable to cross-seal the pouches within about one minute of filling, more preferably within 30 seconds, and most preferably within 15 seconds.

If the reaction mixture decreases the strength of the packaging material, it is preferable to polymerize the composition as soon as possible after the reaction mixture is surrounded by the packaging material. For the combination of (meth)acrylate monomers with ethylene acrylic acid, ethylene vinyl acetate, or ionomer films, it is preferable to polymerize the composition within about 24 hours of sealing the pouches.

Alternatively, a single length of film can be folded lengthwise and sealed on one edge, filled with the reaction mixture, and sealed. In another embodiment, a single length of film can be pulled through a forming collar, sealed to form a tube, filled with the composition, and sealed. Another embodiment can be carried out on commercial liquid form-fill-seal machines. A source of such machines is the Packaging Machinery Division of Eagle Corp. It is contemplated that the seals can be effected in any of a number of different configurations to form multiple pouches across and down the lengths of film.

For example, in addition to the seals on the lateral edges, a seal can also be formed down the center of the lengths of film so that a cross seal will form two filled pouches. The pouches can either be left attached to each other by the cross-seals and/or vertical seals, or they can be cut into individual pouches or strands of pouches. The pouches may each contain the same or different compositions.

The reaction mixture can then be polymerized to form an adhesive composition within the polymeric pouch by any of the aforementioned methods. The adhesive composition within the polymeric pouch may be used to damp vibrations. Alternatively, the adhesive composition itself may be used to damp vibrations.

In another embodiment of the disclosure, a reaction mixture is coated onto a carrier web, covered with a sheet material, and polymerized with transmissive energy, wherein the carrier web, the sheet material, or both, are hot melt coatable with the adhesive. If both the carrier web and the sheet material are hot melt coatable, the resulting composite can be fed directly into a hot melt coater, or cut into smaller strips or pieces and fed to the hot melt coater. If only one of the carrier web or the sheet material is hot melt-coatable with the adhesive, the non-coatable entity is removed before the adhesive is hot melt coated. To facilitate handling after the non-coatable entity is removed, the polymerized adhesive can be folded over onto itself so that the coatable entity substantially surrounds the major surfaces of the coated adhesive. The adhesive web can then be fed into a hot melt coater, or it can be cut to smaller strips or pieces before hot melt coating.

If either the carrier web or the sheet material are not coatable with the adhesive (e.g., as in the case of Type II compositions, described below), it should be treated, if necessary, so that the adhesive can be removed easily from it. Such treatments include silicone release coatings, polyfluoropolyether coatings, and polyfluoroethylene coatings such as Teflon™.

The carrier web should provide sufficient strength to support the coated reaction mixture during polymerization, or it can be supported by a platen during polymerization. The carrier web can be an endless conveyor belt, or it can be a flexible material which can be wound into a roll with the adhesive; the carrier web is itself a sheet material. Endless conveyor belts can be made from silicone elastomers; polymeric films such as those made from polyfluoroethylene, polyester, nylon, polycarbonate, and the like; metals such as stainless steel; rubber; glass fibers; and the like. Useful flexible materials include paper and polymeric films such as those made from polyester, nylon, polycarbonates, polyolefins, ethylene acrylic acid, ethylene vinyl acetate, ionomers, and the like. Coatable flexible materials include polyolefins such as polypropylene, polyethylene, and polybutadiene; ethylene acrylic acid; ethylene vinyl acetate; and ionomers.

Likewise, the sheet material can be made from the aforementioned flexible materials as well as non-flexible plates made of glass, polymers, or metals, which may optionally be coated with a release material. If the reaction mixture is to be subsequently photo-polymerized, the carrier web, the sheet material, or both should be sufficiently transparent to actinic radiation to effect such photopolymerization.

Preferably, the packaging material does not substantially adversely affect the adhesive properties of a hot melt coated mixture of the packaging material and an adhesive produced from polymerization of the reaction mixture, and a hot melt coated mixture of the adhesive and the packaging material preferably has a storage modulus when measured in torsional shear at 25° C. and at 1 radian/second of between about 104 and about 108 dynes/cm$^2$.

The adhesive compositions of the present disclosure may be coated upon a variety of flexible and inflexible backing materials using, for example, conventional coating techniques to produce adhesive-coated materials. Flexible substrates are defined herein as any material that is conventionally utilized as a tape backing, or may be of any other flexible material. Examples include, but are not limited to, plastic films such as polypropylene, polyethylene, polyvinyl chloride, polyester (polyethylene terephthalate), other polyesters (such as polyethylene naphthalate), polycarbonate, polymethyl(meth)acrylate (PMMA), cellulose acetate, cellulose triacetate, indium tin oxide coated polyester, and ethyl cellulose. Foam backings may be used. Examples of inflexible substrates include, but are not limited to, metal, metallized polymeric film, indium tin oxide coated glass, PMMA plate, polycarbonate plate, glass, or ceramic sheet material.

Adhesive-coated sheet materials may take the form of any article conventionally known to be utilized with adhesive compositions such as labels, tapes, signs, covers, marking indices, display components, touch panels, and the like. Flexible backing materials having microreplicated surfaces are also contemplated. Coating thicknesses may vary, but coating thicknesses of 2-500 micrometers (dry thickness), such as 25 to 250 micrometers, are contemplated.

The adhesive can also be provided as a single coated or double coated tape in which the adhesive is disposed on a permanent backing. Backings can be made from plastics (e.g., polypropylene, including biaxially oriented polypropylene, vinyl, polyethylene, polyester such as polyethylene terephthalate), nonwovens (e.g., papers, cloths, nonwoven scrims), metal foils, foams (e.g., polyacrylic, polyethylene, polyurethane, neoprene), and the like. Foams are commercially available from various suppliers such as 3M Co., Voltek, Sekisui, and others. The foam may be formed as a coextruded sheet with the adhesive on one or both sides of the foam, or the adhesive may be laminated to it. When the adhesive is laminated to a foam, it may be desirable to treat the surface to improve the adhesion of the adhesive to the foam or to any of the other types of backings. Such treatments are typically selected based on the nature of the materials of the adhesive and of the foam or backing and include primers and surface modifications (e.g., corona treatment, surface abrasion). Additional tape constructions include those described in U.S. Pat. No. 5,602,221 (Bennett et al.).

For a single-sided tape, the side of the backing surface opposite that where the adhesive is disposed is typically coated with a suitable release material. Release materials are known and include materials such as, for example, silicone, polyethylene, polycarbamate, polyacrylics, and the like. For double coated tapes, another layer of adhesive is disposed on the backing surface opposite that where the adhesive of the disclosure is disposed. The other layer of adhesive can be different from the adhesive of the disclosure, e.g., a conventional (meth)acrylic ester PSA, or it can be the same adhesive as the disclosure, with the same or a different formulation. Double coated tapes are typically carried on a release liner.

If the adhesive composition is to be part of a tape, the substrate may be a tape backing. In certain methods, the tape backing material is coextruded with the adhesive composition from a film die and the multilayer construction is then cooled to form the tape in a single coating step. If the adhesive composition is to be a transfer tape, the adhesive layer may be a free standing film and the substrate may be a release liner or other releasing substrate. After forming, the adhesive layer or film can be solidified by quenching using both direct methods (e.g. chill rolls or water batch) and indirect methods (e.g. air or gas impingement).

The above-described compositions can be coated on a substrate using conventional coating techniques modified as appropriate to the particular substrate. For example, these compositions can be applied to a variety of solid substrates by methods such as roller coating, flow coating, dip coating, spin coating, spray coating knife coating, die coating, solution coating, emulsion coating, extrusion coating, coextrusion coating, solventless coating, waterborne coating, and any combinations thereof. These various methods of coating allow the compositions to be placed on the substrate at variable thicknesses thus allowing a wider range of use of the compositions.

The resulting radiation crosslinkable pressure-sensitive adhesive layer is then subjected to a crosslinking step by being exposed to suitable radiation from at least one light-emitting diode, such as UV radiation, to effect crosslinking. The one or more light-emitting diodes provide radiation having a wavelength in the range of 200 to 600 nm, or 270 to 500 nm, or 300 to 400 nm, or 300 to 500 nm, or 320 to 380 nm, or 365 nm. The at least one light-emitting diode provides radiation centered at a single wavelength and having a wavelength range of no more than 10 nm, or alternatively at a plurality of wavelengths, such as by employing a bank of LEDs, including two or more LEDs. At least two LEDs provide radiation centered at a different wavelength from each other. Often a narrow band of wavelengths provided by the LED is preferred, such as a wavelength range of no more than 8 nm, or no more than 6 nm, or even as narrow as 4 nm. In certain embodiments, at least one ultraviolet light-emitting diode is employed.

In a second aspect, a radiation crosslinked pressure-sensitive adhesive is provided. The radiation crosslinked pressure-sensitive adhesive is prepared by a method as described in detail above with respect to the first aspect.

In a third aspect, an adhesive article is provided. The adhesive article includes a flexible backing layer and a radiation crosslinked pressure-sensitive adhesive. The radiation crosslinked pressure-sensitive adhesive is prepared by a method as described in detail above with respect to the first aspect.

Exemplary Embodiments

1. A method of preparing a crosslinked pressure-sensitive adhesive including exposing at least one radiation crosslinkable pressure-sensitive adhesive composition to radiation from at least one light-emitting diode to crosslink the radiation crosslinkable pressure-sensitive adhesive composition and thereby form the crosslinked pressure-sensitive adhesive.

2. The method of embodiment 1, wherein the at least one crosslinkable pressure-sensitive adhesive composition comprises:
   a) a polymerized reaction product of components comprising:
     i) at least one alkyl (meth)acrylate monomer;
     ii) optionally at least one acid-functional ethylenically unsaturated monomer;
     iii) optionally at least one non-acid-functional ethylenically unsaturated monomer;
     iv) at least one initiator; and
     v) optionally at least one radiation-sensitive crosslinker;
   b) optionally at least one non-photocrosslinkable (co) polymer;
   c) optionally at least one radiation-sensitive crosslinker;
   d) optionally at least one adjuvant; and
   e) optionally at least one tackifier;
   wherein the pressure-sensitive adhesive composition comprises at least one radiation-sensitive crosslinker.

3. The method of embodiment 1 or embodiment 2, wherein the crosslinked pressure-sensitive adhesive includes a hot melt processable pressure-sensitive adhesive.

4. The method of embodiment 2, wherein the crosslinked pressure-sensitive adhesive further includes a solvent.

5. The method of any of embodiments 1 to 4, further including coating the radiation crosslinkable pressure-sensitive adhesive precursor onto a substrate before the radiation crosslinking.

6. The method of embodiment 5, wherein the substrate includes a tape backing or a release liner.

7. The method of any of embodiments 1 to 6, wherein the at least one light-emitting diode provides radiation having a wavelength in the range of 200 to 600 nm.

8. The method of any of embodiments 1 to 7, wherein the at least one light-emitting diode provides radiation having a wavelength in the range of 250 to 500 nm.

9. The method of any of embodiments 1 to 8, wherein the at least one light-emitting diode provides radiation having a wavelength in the range of 300 to 400 nm.

10. The method of any of embodiments 1 to 9, wherein the at least one light-emitting diode provides radiation having a wavelength range of no more than 10 nm.

11. The method of any of embodiments 1 to 9, wherein the at least one light-emitting diode includes at least two LEDs that provide radiation centered at a different wavelength from each other.

12. The method of any of embodiments 2 to 11, wherein at least one tackifier is present and includes at least one terpene phenolic, rosin, rosin ester, ester of hydrogenated rosin, synthetic hydrocarbon resin, or combinations thereof.

13. The method of embodiment 12, wherein the synthetic hydrocarbon resin is selected from aliphatic C5 hydrocarbons, aromatic C9 hydrocarbons, partially hydrogenated versions of any of the foregoing, fully hydrogenated versions of any of the foregoing, and combinations thereof.

14. The method of any of embodiments 2 to 13, wherein the at least one tackifier is present in an amount greater than 10 parts per weight per 100 parts by weight of the copolymer, or in amount from 40 parts to 70 parts by weight per 100 parts by weight of total monomer.

15. The method of any of embodiments 2 to 14, wherein the at least one radiation-sensitive crosslinker includes a co-polymerized type (II) photocrosslinker.

16. The method of embodiment 15, wherein the co-polymerized type (II) crosslinker is selected from the group consisting of para-acryloxybenzophenone (ABP), para-acryloxyethoxybenzophenone (AEBP), para-N-(methylacryloxyethyl)-carbamoylethoxybenzophenone, 4-acryloxydiethoxy-4-chlorobenzophenone, para-acryloxyacetophenone, ortho-acrylamidoacetophenone, acrylated anthraquinones, acrylated benzophenone derivatives, and combinations thereof.

17. The method of any of embodiments 2 to 16, wherein the at least one radiation-sensitive crosslinker is present in an amount of at least 0.05 parts by weight per 100 parts by weight of total monomer.

18. The method of any of embodiments 2 to 17, wherein the at least one radiation-sensitive crosslinker is present in an amount of at least 0.10 parts by weight per 100 parts by weight of total monomer.

19. The method of any of embodiments 2 to 18, wherein the at least one optional non-acid-functional ethylenically unsaturated monomer is present and includes a hydrogen-donating monomer.

20. The method of embodiment 19, wherein the hydrogen-donating monomer is selected from the group consisting of N,N-dimethyl acrylamide, N-vinyl caprolactam, N-Vinylpyrrolidone, N-isopropyl acrylamide, N,N-dimethylaminoethyl methacrylate, 2-[[(Butylamino)carbonyl]oxy]ethyl acrylate N,N-dimethylaminopropyl methacrylamide, N,N-diethylaminopropyl methacrylamide, N,N-dimethylaminoethyl acrylate, N,N-diethylaminoethyl acrylate, N,N-dimethylaminopropyl acrylate, N,N-diethylaminopropyl acrylate, N,N-diethylaminoethyl methacrylate, N,N-dimethylaminoethyl acrylamide, N,N-dimethylaminoethyl methacrylamide, N,N-diethylaminoethyl acrylamide, N,N-diethylaminoethyl methacrylamide, and combinations thereof.

21. The method of any of embodiments 2 to 20, wherein the at least one optional non-acid-functional ethylenically unsaturated monomer is present in an amount of at least 0.05 parts by weight per 100 parts by weight of total monomer.

22. The method of any of 2 to 21, wherein the alkyl group of the alkyl (meth)acrylate monomer preferably includes from 1 to 24, more preferably from 4 to 20, even more preferably 6 to 15, still more preferably from 6 to 10 carbon atoms.

23. The method of any of embodiments 2 to 22, wherein the alkyl (meth)acrylate monomer is selected from the group consisting of methyl acrylate, ethyl acrylate, n-propyl acrylate, isopropyl acrylate, n-butyl acrylate, isobutyl acrylate, n-pentyl acrylate, iso-pentyl acrylate, n-hexyl acrylate, iso-hexyl acrylate, cyclohexyl acrylate, octyl acrylate, iso-octyl acrylate, 2-ethylhexyl acrylate, decyl acrylate, lauryl acrylate, 2-propylheptyl acrylate, stearyl acrylate, isobornyl acrylate, and combinations thereof.

24. The method of any of embodiments 2 to 23, wherein the alkyl (meth)acrylate monomer is selected from the group consisting of iso-octyl acrylate, 2-ethylhexyl acrylate, butyl acrylate, and combinations thereof.

25. The method of any of embodiments 2 to 24, wherein the at least one initiator is present and includes a photoinitiator selected from benzyl dimethyl ketal, 1-hydroxycyclohexyl phenyl ketone, 2-methyl-2-hydroxypropiophenone, benzoin methyl ether, benzoin isopropyl ether, anisoin methyl ether, aromatic sulfonyl chlorides, photoactive oximes, 2,2-dimethoxy-1,2-diphenylethan-1-one, and combinations thereof.

26. The method of any of embodiments 2 to 25, wherein the at least one initiator includes a photoinitiator present in an amount between about 0.01 to about 5.0 parts by weight per 100 parts of total monomer.

27. The method of any of embodiments 2 to 24, wherein the at least one initiator is present and includes a thermal initiator selected from the group consisting of 2,2'-azobis(2,4-dimethylvaleronitrile), 2,2'-azobisoisobutyronitrile, 2,2'-azobis-2-methylbutyronitrile, (1,1'-azobis(1-cyclohexanecarbonitrile), 2,2'-azobis(methyl isobutyrate), 2,2'-azobis (2-amidinopropane) dihydrochloride, 2,2'-azobis(4-methoxy-2,4-dimethylvaleronitrile), benzoyl peroxide, acetyl peroxide, lauroyl peroxide, decanoyl peroxide, dicetyl peroxydicarbonate, di(4-t-butylcyclohexyl) peroxydicarbonate, di(2-ethylhexyl) peroxydicarbonate, t-butylperoxypivalate, t-butylperoxy-2-ethylhe-xanoate, dicumyl peroxide, potassium persulfate, sodium persulfate, ammonium persulfate, combinations of the persulfates with sodium metabisulfite or sodium bisulfite, benzoyl peroxide plus dimethylaniline, cumene hydroperoxide plus cobalt naphthenate, and combinations thereof.

28. The method of any of embodiments 2 to 27, wherein the at least one initiator includes a thermal initiator present in an amount from about 0.01 to about 5.0 parts by weight per 100 parts of total monomer.

29. The method of any of embodiments 2 to 28, wherein the at least one non-photocrosslinkable (co)polymer is present and is selected from the group consisting of poly(methyl methacrylate), polyvinylbutyral, polystyrene and polyacrylonitrile, and combinations thereof.

30. The method of any of embodiments 2 to 29, wherein the at least one non-photocrosslinkable (co)polymer is present in an amount from about 0.1 to about 25 parts by weight per 100 parts of total monomer.

31. The method of any of embodiments 2 to 30, wherein the acid-functional ethylenically unsaturated monomer is present and is selected from the group consisting of acrylic acid, itaconic acid, methacrylic acid, acrylonitrile, methacrylonitrile, vinyl acetate, isobornyl acrylate, cyano ethyl acrylate, maleic anhydride, hydroxyalkylacrylates, beta-carboxyethyl acrylate, vinyl esters of neodecanoic, neononanoic, neopentanoic, 2-ethylhexanoic, or propionic acids, and combinations thereof.

32. The method of embodiment 31, wherein the acid-functional ethylenically unsaturated monomer is present in an amount between 0.5 and 25 parts by weight per 100 parts by weight of total monomer.

33. The method any of embodiments 2 to 32, wherein the at least one adjuvant is present and includes a radiation-crosslinkable additive, a thickener, a particulate filler, an antioxidant, a colorant, a scent, or combinations thereof.

34. The method of embodiment 33, wherein the radiation-crosslinkable additive includes at least one bis(benzophenone).

35. The method of any of embodiments 2 to 34, wherein c) is present and includes a crosslinking polymer.

36. The method of any of embodiments 1 to 35, wherein the at least one light-emitting diode includes at least one ultraviolet light-emitting diode.

37. The radiation crosslinked pressure-sensitive adhesive of the method of any of embodiments 1 to 36.

38. An adhesive article including the radiation crosslinked pressure-sensitive adhesive of any of embodiments 1 to 36 and a flexible backing layer.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible.

Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Summary of Materials

Unless otherwise noted, all parts, percentages, ratios, etc. in the Examples and the rest of the specification are by weight. Table 1 provides a source for materials used in the Examples below:

TABLE 1

Materials

| Name | Material | Source |
| --- | --- | --- |
| 2-EHA | 2-Ethylhexyl acrylate | BASF, Florham Park, NJ |
| AA | Acrylic acid | BASF, Florham Park, NJ |
| IOA | Iso-octyl acrylate | 3M Company, St. Paul, MN |
| HDDA | Hexanediol diacrylate | BASF, Ludwigshafen, Germany |
| DMAEMA | N,N-Dimethylaminoethyl methacrylate | Evonik, Essen, Germany |
| ABP | Acryloxy benzoate | 3M Company, St. Paul, MN |
| AEBP | Para-acryloxyethoxybenzophenone | 3M Company, St. Paul, MN |
| Irgacure 651 | 2,2-Dimethoxy-1,2-diphenylethan-1-one | Ciba Specialty Chemicals, Basel, Switzerland |
| Foral 3085 | A glycerol ester of highly hydrogenated rosin | Pinova, Brunswick, GA |
| R7100 | A partially hydrogenated inert thermoplastic resin derived from petrochemical feedstocks | Eastman Chemical Company, Kingsport, TN |
| Vazo 601 | Dimethyl-2,2'-azobisisobutyrate | Wako Chemicals GmbH |

Test Method 1. Gel Percent

All weights were recorded to five significant FIGURES. A solvent gel test was done in which a 0.49 cm×0.49 cm (1.25 inch×1.25 inch) square was die-cut from an adhesive coated liner. The adhesive was removed from the liner, placed in a pre-weighed fine mesh metal basket, and the adhesive with basket weighed to obtain the initial adhesive weight. The basket with adhesive was then placed in a glass jar and approximately 100 mL of tetrahydrofuran (THF) from VWR Scientific (VWR, Radnor, Pa.) was added to immerse the adhesive, being careful not to fill solvent past the upper edges of the basket. After 72 hours of immersion, the basket with adhesive was removed using tongs and excess solvent was allowed to drain before the adhesive and basket were transferred to a pre-weighed aluminum weighing pan. The adhesive in the basket was allowed to partially air-dry to remove some THF before heating the basket with adhesive in the pan for 60 minutes in an oven at 60° C. After removal from the oven, the pan and contents were weighed within 5 minutes to minimize any moisture pick-up from the atmosphere, to determine the remaining adhesive weight. The gel percent was calculated as the ratio of the remaining adhesive weight to the initial adhesive weight.

Test Method 2. Peel Force

The characterization of 180° Peel adhesion was determined according to ASTM Designation: D3330/D330M-04.

This test method covers the measurement of the peel adhesion of pressure-sensitive adhesive tapes. Peel adhesion is measured against stainless steel and PE covered aluminum panels as test substrates. The stainless steel panels have the following dimensions: 50 mm by 125 mm and a minimum thickness of 1.1 mm. The PE covered aluminum panels have a dimension of 50 mm by 150 mm and a thickness of 2 mm.

In case of the stainless steel panels, the panels need to conform to Type 302 or 304 of Specification ASTM A 666, having a bright annealed finish. The PE covered aluminum panels are made by selecting a 13 mils thick (330 micrometers) polyethylene film with similar dimensions as the aluminum panel, the PE film made from polyethylene (PE) pellets being available under trade designation "VORIDIAN POLYETHYLENE 1550P" from Eastman Chemical Co. (Kingsport, Tenn., USA), and fixing the PE film with an adhesive film to the aluminum plate. Test surface of the PE selected is the rougher surface side.

Prior to testing all samples are conditioned at ambient conditions (23° C.+/−2° C. and 50%+/−5% relative humidity).

In a climate room set at ambient conditions (23° C.+/−2° C. and 50%+/−5% relative humidity), 1 by 1 inch (2.54 cm) wide adhesive strips having a length of approximately 300 mm are cut from the conditioned samples using a specimen cutter holding two single-edged razor blades in parallel planes of the adhesive. The strip is then placed without pressure onto either a cleaned, stainless steel panel or a PE panel. Cleaning of the stainless steel panels is done by wiping the panels with a lint free tissue first with a pass of methyl ethyl ketone (MEK), followed by a wipe with n-heptane and finally another pass with methyl ethyl ketone (MEK). Wiping of the panels per pass of solvent is always done until dryness.

The adhesive strips are then laminated onto the substrate using a 2 kg hand-held rubber-covered roller at a rate of 10+/−0.5 mm/s with 2 passes in each direction. After a dwell time of 20 minutes in the climate room, a 180° peel test is performed using a FP-2255 Peel Tester (manufactured by Thwing-Albert Instrument Company), with data collected and averaged over 10 seconds. Three measurements are made per example and the average recorded in N/inch.

Test Method 3. Static Shear

The characterization of static shear was determined according to ASTM D 3564 (Procedure A). Shear strength on stainless steel (SS):

This test method determines the ability of pressure-sensitive adhesive tapes to remain adhered under constant load applied parallel to the surface of the tape and substrate.

Prior to testing all samples are conditioned at ambient conditions (23° C.+/−2° C. and 50%+/−5% relative humidity).

The shear strength is determined following ASTM Designation: D 3654/D 3654M-06.

First a 1 inch (2.54 cm) wide strip of adhesive is cut from the tape by using a specimen cutter holding two single-edge razor blades in parallel planes, the blades spaced 1 inch (2.54 cm) apart. The adhesive strip is then placed onto a clean, stainless steel panel with bright annealed finish in accordance with Specification ASTM A666 having a dimension of 50 mm by 125 mm (and a minimum thickness of 1.1 mm), covering a 1 inch by 1 inch (2.54 cm×2.54 cm) area of the stainless steel panel. The adhesive strip is then over-rolled twice in each direction using a hand-held rubber-covered 2 kg hand-roller at an approximate rate of 10 mm+/−0.4 mm/s. A 500 gram weight is then used as the static load, and the test samples are placed on an automated timing apparatus in an air circulated oven at 70° C.

Example 1

A copolymer of 2-EHA, AA, and IOA was bulk polymerized under UV light sealed in polyolefin packages, as described in U.S. Pat. No. 6,294,249 (Hamer et al.). A heat sealable polyolefin layer was used to form rectangular packaging material on a liquid form, fill, and seal machine. The packaging material was filled with a pre-adhesive composition having a blend of 95% 2-ethylhexyl acrylate (2-EHA), 5% acrylic acid (AA), and 0.15% parts per hundred parts of resin (phr) Irgacure 651, to which was added a 24.8% solution of acryloxy benzophenone (ABP) dissolved in iso-octyl acrylate (IOA). The pre-adhesive mixture contained 0.05 phr ABP. The filled package was then heat sealed at the top in the cross direction through the monomer to form individual packages containing 27 grams of the pre-adhesive composition. The packages were placed in a water bath that was maintained between about 16° C. and 32° C. and exposed to ultraviolet radiation for approximately 12.5 minutes. The lamps were set to give 5.0 mW/cm$^2$ UVA irradiance at the surface of the package. The packaged adhesive was then extruded to give a 2 mil (50.8 micrometer) thick coating on a siliconized release liner to provide a transfer adhesive layer.

Example 2

The procedure of Example 1 was followed except the amount of ABP in the blend was increased to give a final concentration of 0.10 phr.

Example 3

The procedure of Example 1 was followed except the amount of ABP in the blend was increased to give a final concentration of 0.15 phr.

Example 4

This adhesive sample included 100 parts of a pressure-sensitive adhesive comprising 95.5% IOA, 4.5% AA, 0.0045% hexanediol diacrylate (HDDA), and 0.15% ABP, which was bulk polymerized according to the procedure of Example 1, then co-extruded with 4 parts of a crosslinking polymer (comprising 90% IOA, 5% dimethylaminoethyl methacrylate (DMAEMA), and 5% AEBP), and 55 parts of Foral 3085 tackifier onto a siliconized release liner at a coating weight of 95 g/m$^2$. The crosslinking polymer was produced via solution polymerization in ethylacetate, at 45% solids. A 45 wt % solution of the acrylate mixture in ethyl acetate was prepared. The polymerization was started by an azo initiator (Vazo 601) and the polymerization took place under constant stirring for 20 hours at 60° C. The solvent was then stripped prior to hot melt processing.

Example 5

This adhesive sample included 100 parts of a pressure-sensitive adhesive comprising 99.5% IOA, 0.5% AA, and 0.1% ABP, which was bulk polymerized according to the procedure of Example 1, then co-extruded with 5 parts of a crosslinking polymer (comprising 90% IOA, 5% dimethylaminoethyl methacrylate (DMAEMA), and 5% AEBP) and 60 parts R7100 tackifier onto a siliconized release liner at a coating weight of 100 g/m$^2$. The crosslinking polymer was produced as described in Example 4.

Examples 6-10

Five samples of the transfer adhesive from Example 1 were exposed to UV radiation from a STARFIRE MAX 365 nm LED array from Phoseon Technologies (Hillsboro, Oreg.) positioned 2 inches (5.08 centimeters) above a conveyorized belt running at a constant speed of 15 feet per minute (4.6 meters per minute) for 1-5 passes, respectively. Under these conditions, the UVA peak irradiance was 720 mW/cm$^2$ and the energy per pass was 400 mJ/cm$^2$.

Examples 11-15

The procedure of Examples 6-10 was repeated with the adhesive from Example 2.

Examples 16-20

The procedure of Examples 6-10 was repeated with the adhesive from Example 3.

Examples 21-23

The adhesive of Example 1 was exposed to 20, 40, and 80 mJ/cm$^2$, respectively, of UVC radiation from a 600 W/in Fusion H bulb.

Examples 24-26

The adhesive of Example 2 was exposed to 20, 40, and 80 mJ/cm$^2$, respectively, of UVC radiation from a 600 W/in Fusion H bulb.

Examples 27-29

The adhesive of Example 3 was exposed to 20, 40, and 80 mJ/cm$^2$, respectively, of UVC radiation from a 600 W/in Fusion H bulb.

Examples 30-34

The procedure of Examples 6-10 was repeated with the adhesive from Example 4.

Examples 35-39

The procedure of Examples 6-10 was repeated with the adhesive from Example 5.

Examples 40-42

The adhesive of Example 4 was exposed to 150, 200, and 250 mJ/cm$^2$, respectively, of UVB radiation from a 600 W/in Fusion D bulb.

Examples 43-45

The adhesive of Example 5 was exposed to 150, 200, and 250 mJ/cm$^2$, respectively, of UVB radiation from a 600 W/in Fusion D bulb.

The performance of the crosslinked pressure-sensitive adhesives of Examples 6-20, containing three different levels of ABP and crosslinked using 365 nm LEDs, are summarized in Table 2. All showed a rapid increase in gel and shear properties after irradiating and were comparable to comparatives crosslinked using a broadband Fusion H bulb (Examples 21-29). All the examples except for Example 6, including the Fusion comparatives, easily met the 10,000 minute target. This is presumably due to the fact that the crosslinked pressure-sensitive adhesives have high chain entanglement and require a smaller degree of crosslinking than adhesives having less chain entanglement.

As the ABP level increases in Examples 6-10, the peel force tends to drop. When exposed to the UVA LEDs, there is a drop in peel force. However, for a given ABP level, the peel force is surprisingly independent of the UV energy.

The Fusion H bulb data for Examples 21-29 look quite different from the LED data. Although when the ABP concentration is increased, the peel force drops, unlike the UV LED examples above, it is seen that at a fixed ABP concentration, peel force drops as exposure increases. This is attributable to the broad spectral output of a mercury bulb. While the longer wavelengths can induce crosslink formation, they are absorbed to a lesser extent and can penetrate through the coating while the shorter wavelength is preferentially absorbed near the surface. As a result, the extent of crosslinking is much greater near the adhesive surface resulting in a loss of tack.

TABLE 2

Examples 6-29

| Example | Adhesive | ABP | Source | Passes | mJ/cm$^2$, LED (UVA), H bulb (UVC) | Gel %, 72 hr THF | 180° Peel, N/in, SS, 12"/min | 70° C., 1 x 1", 1 kg, min |
|---|---|---|---|---|---|---|---|---|
| ctrl | 1 | 0.05 | LED | 0 | 0 | 1.5 | 13.4 | 5.9 |
| 6 | | | | 1 | 400 | 79.9 | 13.1 | 402 |
| 7 | | | | 2 | 800 | — | — | — |
| 8 | | | | 3 | 1200 | 88.7 | 12.0 | 10000 |
| 9 | | | | 4 | 1600 | — | — | — |
| 10 | | | | 5 | 2000 | 93.3 | 11.9 | 10000 |
| ctrl | 2 | 0.10 | LED | 0 | 0 | 2.5 | 14.3 | 3.2 |
| 11 | | | | 1 | 400 | 74.7 | 12.2 | 10000 |
| 12 | | | | 2 | 800 | — | — | — |
| 13 | | | | 3 | 1200 | 86.2 | 12.1 | 10000 |
| 14 | | | | 4 | 1600 | — | — | — |
| 15 | | | | 5 | 2000 | 87.6 | 12.0 | 10000 |
| ctrl | 3 | 0.15 | LED | 0 | 0 | 3.8 | 14.1 | 6 |
| 16 | | | | 1 | 400 | 53.4 | 10.4 | 10000 |
| 17 | | | | 2 | 800 | — | — | — |
| 18 | | | | 3 | 1200 | 70.4 | 11.1 | 10000 |
| 19 | | | | 4 | 1600 | — | — | — |
| 20 | | | | 5 | 2000 | 72.5 | 11.2 | 10000 |
| ctrl | 1 | 0.05 | H bulb | | 0 | 13.4 | — | — |
| 21 | | | | | 20 | 67.4 | 21.1 | 10000 |
| 22 | | | | | 40 | 72.2 | 18.2 | 10000 |
| 23 | | | | | 80 | 75.4 | 15.7 | 10000 |
| ctrl | 2 | 0.10 | H bulb | | 0 | | 14.3 | — |
| 24 | | | | | 20 | 84.4 | 17.7 | 10000 |
| 25 | | | | | 40 | 86.1 | 15.5 | 10000 |
| 26 | | | | | 80 | 84.9 | 13.7 | 10000 |
| ctrl | 3 | 0.15 | H bulb | | 0 | — | 14.1 | — |
| 27 | | | | | 20 | 81.6 | 16.3 | 10000 |
| 28 | | | | | 40 | 89.0 | 13.1 | 10000 |
| 29 | | | | | 80 | 87.2 | 9.5 | 10000 |

Performance attributes for Examples 30-45 including adhesive coatings crosslinked using the 365 nm LEDs, along with comparative data for samples crosslinked using a Fusion D bulb at three different exposure levels are shown in Table 3 below.

TABLE 3

Examples 30-45

| Example | Adhesive | Source | Passes | mJ/cm$^2$, LED (UVA), D bulb (UVB) | Gel %, 72 hr THF | 90° Peel, N/in, SS, 12"/min | 180° Peel, N/in, SS, 12"/min | 25° C, 1 x 1", 1 kg, mm | 70° C, 1 x 1", 500 g, mm | 70° C, 1 x 1", 1 kg, min |
|---|---|---|---|---|---|---|---|---|---|---|
| 30 | 4 | LED | 1 | 400 | 36.8 | — | 25.7 | — | 10000 | 3394 cf$^1$ |
| 31 | | | 2 | 800 | 43.2 | — | 25.2 | — | 10000 | 10000 |

TABLE 3-continued

Examples 30-45

| Example | Adhesive | Source | Passes | mJ/cm², LED (UVA), D bulb (UVB) | Gel %, 72 hr THF | 90° Peel, N/in, SS, 12"/min | 180° Peel, N/in, SS, 12"/min | 25° C, 1 x 1", 1 kg, mm | 70° C, 1 x 1", 500 g, mm | 70° C, 1 x 1", 1 kg, min |
|---|---|---|---|---|---|---|---|---|---|---|
| 32 | | | 3 | 1200 | 47.2 | — | 24.9 | — | 10000 | 4932 cf |
| 33 | | | 4 | 1600 | 49.5 | — | 25.4 | — | 10000 | 3995 cf |
| 34 | | | 5 | 2000 | 50.5 | — | 22.8 | — | 10000 | 1906 po² |
| 35 | 5 | LED | 1 | 400 | 37.9 | — | 34.7 | — | 10000 | 2669 cf/po |
| 36 | | | 2 | 800 | 40.9 | — | 33.5 | — | 10000 | 574 cf |
| 37 | | | 3 | 1200 | 45.3 | — | 26.4 | — | 10000 | 379 po |
| 38 | | | 4 | 1600 | 49.3 | — | 24.3 | — | 10000 | 288 po |
| 39 | | | 5 | 2000 | NA | — | NA | — | — | — |
| ctrl | 4 | D bulb | | 0 | — | 26.5 | | — | — | — |
| 40 | | | | 150 | 48.0 | 22.0 | 20.5 | 10000 | 10000 | 2358 cf/po |
| 41 | | | | 200 | 47.7 | 21.0 | 19.2 | 10000 | 10000 | 3046 po |
| 42 | | | | 250 | 47.6 | 22.0 | 19.2 | — | 10000 | 1466 cf |
| 43 | 5 | D bulb | | 150 | 39.9 | 25.5 | 25.6 | 10000 | 8000 po/cf | 17 po |
| 44 | | | | 200 | 41.9 | 25.0 | 26.1 | 10000 | 10000 | 40 po |
| 45 | | | | 250 | 40.9 | 27.0 | 26.5 | 10000 | 10000 | 87 po |

¹cf = cohesive failure.
²po = pop-off.

Gel results on irradiated samples using the two sources are comparable. The trend for Adhesive 4 was flat but Adhesive 5 showed a clear drop in peel force as exposure increased. There is no obvious explanation for the difference since the levels of ABP and AEBP in the two examples is comparable.

The data show that the peel force remains constant for both Adhesives 4 and 5 over the exposure range studied. This is in sharp contrast to exposures of Adhesives 1-3 using a Fusion H bulb where the peel force dropped sharply as a function of exposure (see, e.g., the peel force for Example 36 as compared to Example 43). The difference is most likely attributable to the increase in UVC output from the H bulb coupled with the higher absorption coefficient of ABP in the UVC range leads to an increase in the crosslink gradient.

The shear data for Adhesives 4 and 5 demonstrate the increased high temperature shear performance of the LED-crosslinked adhesives in the presence of tackifiers. Both adhesives passed the 10,000 minute mark at 70° C. with a 500 gram load. In order to see differentiation, the load had to be increased to 1 kilogram. Comparing Examples 30-34 with Examples 40-42, the LED shears tend to all be higher, with Example 31 exceeding 10,000 minutes. The same is true of Examples 35-38 compared to D-bulb Examples 43-45. In general, LED failures tend to be cohesive in nature while D bulb failures show more pop-off. This again is indicative of a loss of tack at the surface as shear properties build. Note that even with LEDs, the extent of surface crosslinking can increase to the point where pop-off becomes the dominant failure mode.

While the specification has described in detail certain exemplary embodiments, it will be appreciated that those skilled in the art, upon attaining an understanding of the foregoing, may readily conceive of alterations to, variations of, and equivalents to these embodiments. Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

What is claimed is:

1. A method of preparing a crosslinked pressure-sensitive adhesive comprising selecting one or more radiation wavelengths provided by at least one light-emitting diode, for crosslinking of the pressure-sensitive adhesive, which do not substantially overlap with wavelengths at which a particular tackifier has absorption; and exposing at least one radiation crosslinkable pressure-sensitive adhesive composition to radiation from at least one light-emitting diode to crosslink the radiation crosslinkable pressure-sensitive adhesive composition and thereby form the crosslinked pressure-sensitive adhesive, wherein the crosslinked pressure-sensitive adhesive comprises a hot melt processable pressure-sensitive adhesive; wherein the pressure-sensitive adhesive composition comprises a co-polymerized type (II) photocrosslinker; wherein the co-polymerized type (II) photocrosslinker is a photocrosslinker, which upon irradiation, becomes excited to a higher energy state in which it can abstract a hydrogen atom from a hydrogen-donating molecule, thereby generating on the hydrogen-donating molecule a free radical capable of further reaction;

wherein the at least one crosslinkable pressure-sensitive adhesive composition comprises:
a) a polymerized reaction product of components comprising:
   i) at least one alkyl (meth)acrylate monomer;
   ii) optionally at least one acid-functional ethylenically unsaturated monomer;
   iii) optionally at least one non-acid-functional ethylenically unsaturated monomer;
   iv) at least one initiator; and
   v) optionally at least one radiation-sensitive crosslinker;
b) optionally at least one non-photocrosslinkable (co)polymer;
c) optionally at least one radiation-sensitive crosslinker;
d) optionally at least one adjuvant; and
e) at least one tackifier;
wherein the pressure-sensitive adhesive composition comprises at least one radiation-sensitive crosslinker;
wherein the at least one tackifier is present in an amount greater than 10 parts per weight per 100 parts by weight of total monomer, or in an amount from 40 parts to 70 parts by weight per 100 parts by weight of total monomer.

2. The method of claim 1, wherein the at least one light-emitting diode provides radiation having a wavelength in the range of 200 to 600 nm.

3. The method of claim 1, wherein the at least one light-emitting diode provides radiation having a wavelength in the range of 300 to 400 nm.

4. The method of claim 1, wherein the at least one light-emitting diode provides radiation having a wavelength range of no more than 10 nm.

5. The method of claim 1, wherein the at least one radiation-sensitive crosslinker comprises a co-polymerized type (II) photocrosslinker.

6. The method of claim 1, wherein the at least one radiation-sensitive crosslinker is present in an amount of at least 0.05 parts by weight per 100 parts by weight of total monomer.

7. The method of claim 1, wherein the at least one optional non-acid-functional ethylenically unsaturated monomer is present and comprises a hydrogen-donating monomer.

8. The method of claim 1, wherein the at least one adjuvant is present and comprises a radiation-crosslinkable additive, a thickener, a particulate filler, an antioxidant, a colorant, a scent, or combinations thereof.

9. The method of claim 8, wherein the radiation-crosslinkable additive comprises at least one bis(benzophenone).

10. The method of claim 1, wherein c) is present and comprises a crosslinking polymer.

11. The radiation crosslinked pressure-sensitive adhesive of the method of claim 1.

12. An adhesive article comprising the radiation crosslinked pressure-sensitive adhesive of claim 1 and a flexible backing layer.

* * * * *